May 13, 1924.

T. MENDENHALL
TRACTOR HITCH
Filed Sept. 20, 1921

1,494,268

Patented May 13, 1924.

1,494,268

UNITED STATES PATENT OFFICE.

THOMAS MENDENHALL, OF RIDGE FARM, ILLINOIS.

TRACTOR HITCH.

Application filed September 20, 1921. Serial No. 501,883.

*To all whom it may concern:*

Be it known that I, THOMAS MENDENHALL, a citizen of the United States, and a resident of Ridge Farm, in the county of Vermilion and State of Illinois, have invented a new and Improved Tractor Hitch, of which the following is a full, clear, and exact description.

The invention relates to improvements in tractor hitches, an object of the invention being to provide a hitch for tractors which will permit the attachment of various types of plows and other agricultural implements to the tractor. The beams of these implements are located in various horizontal planes and I provide a hitch which will facilitate the attachment of a beam regardless of the horizontal plane in which it may be located.

A further object is to provide a tractor hitch which will allow the attachment of a beam in such a manner that a direct pull is exerted on the beam at all times.

With the old form of link connections between the drawbar of a tractor and a plow beam, the plow beam is very often pulled downwardly at its forward end because of the difference in the horizontal planes of the beam and drawbar. This difficulty is entirely overcome by the use of my improved hitch.

Still another object is to provide a device of this character which will be simple and practical in construction, durable and efficient in use and comparatively inexpensive to manufacture.

With these and other objects in view the invention consists in certain novel features of construction, and combinations and arrangements of parts as will be more fully hereinafter described and pointed out in the claims.

In the accompanying drawings—

Figure 1:
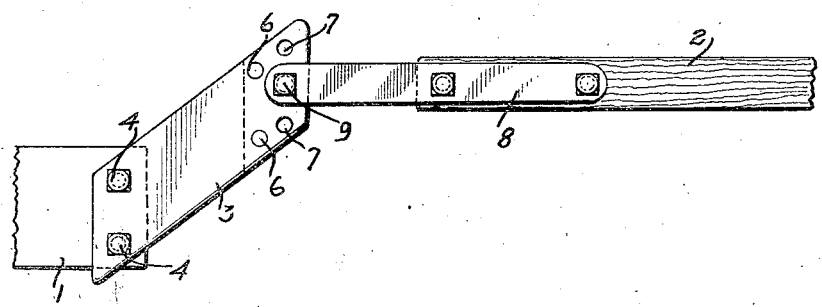
Figure 1 is a view in side elevation of my improved hitch.
Figure 2:
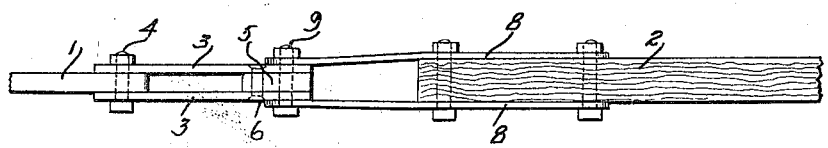
Figure 2 is a top plan view thereof.

Referring in detail to the drawings, 1 represents the drawbar of a tractor, and 2 represents the beam of a plow or other agricultural implement. Agricultural implements of various kinds have their beams located in different horizontal planes and the invention resides in the provision of a novel form of hitch permitting the attachment of any beam to the drawbar of the tractor in such a manner that a direct pull is exerted on the beam.

The improved hitch comprises a pair of plates, such as 3, rigidly secured to opposite sides of the rear end of a drawbar by bolts or other securing devices 4. The forward ends of the plates are secured to the drawbar and the rear ends of the plates project upwardly at an angle to the drawbar. A block 5 is interposed between the upwardly projected rear ends of the plates 3 and the plates and block are permanently connected by rivets or similar securing devices 6. A vertical series of perforations 7 are provided in the rear edge of the hitch extending through the plates 3 and block 5.

Forwardly extending arms 8, preferably of spring steel, are secured to opposite sides of the plow beam 2. A bolt or pin 9 passed selectively through one of the perforations 7, serves to pivotally connect the forward ends of the arms 8 to the hitch.

It will be evident that the plow beam may be very quickly attached to or detached from the tractor and is pivotally connected to the hitch in accordance with the elevation of the plow beam, the vertical series of perforations permitting the attachment of beams located in various horizontal planes. The fact that the hitch is rigidly connected to the drawbar 1 insures a direct pull upon the plow beam regardless of its elevation above the drawbar.

I have illustrated one of the preferred embodiments of the invention, but numerous slight changes and alterations might be made in the general form and arrangements of the parts described without departing from the invention, and hence I do not limit myself to the precise details set forth, but consider myself at liberty to make such changes and alterations as fairly fall within the spirit and scope of the appended claims.

I claim:

1. In a device for hitching a tractor to an agricultural vehicle to be drawn by the tractor, the combination with a pair of substantially horizontally extending plate elements disposed with their flats in vertical planes and one carried by the tractor to extend rearwardly at one level and the other carried by said vehicle to extend forwardly at a higher level, of a hitch proper comprising an elongated structure including a pair of vertically disposed elongate plate members of identical outline arranged in edge-matching relation in side elevation, each said plate member having parallel side edges and parallel end edges at oblique angles to said side edges, said pair of plate members being arranged and bolted at a plurality of points along one of their end edges to the tractor plate element to extend rearwardly and upwardly therefrom, and said pair of plate members having matching transverse holes midway between their side edges and adjacent to their rear ends, the forward end of the plate element carried by the agricultural vehicle carrying detachable pivot means for engaging the holes last-mentioned.

2. In a device for hitching a tractor to an agricultural vehicle to be drawn by the tractor, the combination with a pair of substantially horizontally extending plate elements disposed with their flats in vertical planes and one carried by the tractor to extend rearwardly at one level and the other carried by said vehicle to extend forwardly at a higher level, of a hitch proper comprising an elongated structure including a pair of vertically disposed elongate plate members of identical outline arranged in edge-matching relation in side elevation, each said plate member having parallel side edges and parallel end edges at oblique angles to said side edges, said pair of plate members being arranged and bolted at a plurality of points along one of their end edges to the tractor plate element to extend rearwardly and upwardly therefrom, and said pair of plate members having matching transverse holes midway between their side edges and adjacent to their rear ends, the forward end of the plate element carried by the agricultural vehicle carrying detachable pivot means for engaging the holes last-mentioned; said plate element carried by the tractor being interposed between the plate members of the hitch proper and said plate element carried by the agricultural vehicle having a portion to be laid alongside the outer face of one of said plate members when said pivot means is applied to couple up tractor and vehicle, and there being provided at the rear upper end of the hitch proper a spacing and stiffening plate of similar but smaller outline than said plate members, said spacing plate having parallel side edges as long as the end edges of said plate members, said spacing plate being disposed so that its rear side edge matches the rear end edges of said plate members and so that its end edges match the rear portions of the side edges of said plate members, and said spacing plate being thus permanently secured in place between said plate members by rivets applied to the latter above and below said holes last-mentioned.

THOMAS MENDENHALL.